UNITED STATES PATENT OFFICE.

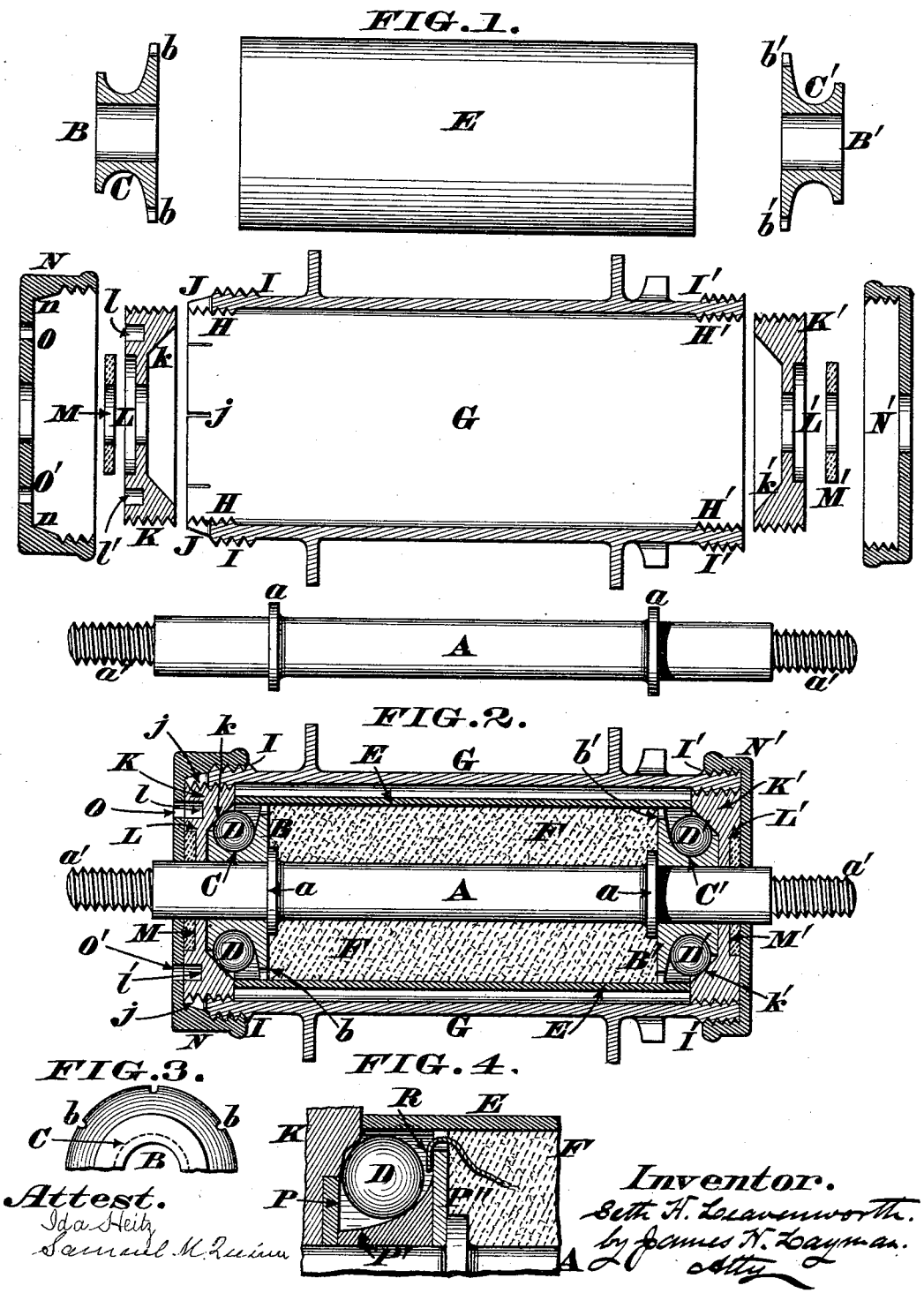

SETH H. LEAVENWORTH, OF CINCINNATI, OHIO, ASSIGNOR OF ONE-HALF TO JOSEPH T. HOMAN, OF SAME PLACE.

WHEEL-HUB.

SPECIFICATION forming part of Letters Patent No. 582,824, dated May 18, 1897.

Application filed June 3, 1896. Serial No. 594,077. (No model.)

*To all whom it may concern:*

Be it known that I, SETH H. LEAVENWORTH, a citizen of the United States, residing at Cincinnati, in the county of Hamilton and State of Ohio, have invented certain new and useful Improvements in Wheel-Hubs; and I do hereby declare the following to be a full, clear, and exact description of the invention, reference being had to the annexed drawings, which form a part of this specification.

This invention relates to those wheel-hubs which have a set of balls interposed between them and the axles around which the wheels revolve, and my improvements are more especially adapted for bicycles, although not restricted to such use.

The principal feature of said improvements is a self-oiling attachment concealed within the hub, surrounding its axle, and so arranged as to permit a constant but limited flow of lubricant into the races containing the balls, as hereinafter more fully described.

Another feature of my invention is a novel combination of devices for taking up any wear and tear of the hub, and thereby confining the balls snugly within their respective races, as hereinafter more fully described.

My invention further comprises certain minor improvements in the details of constructing the hub, as hereinafter more fully described.

In the annexed drawings, Figure 1 is a longitudinal section of the various members of my improved hub separated from each other, the axle and cylinder thereof being seen in elevation and the balls omitted. Fig. 2 is a longitudinal section of the complete hub, a pair of adjustable cups of the same being set up to their full limit. Fig. 3 is an end elevation of a portion of one of the collars of said hub. Fig. 4 is a modification of my invention.

The axle A has a pair of butting-rings $a\ a$ to limit the end play of the hub in both directions.

B B' are cones or collars bearing against said rings and so turned out as to afford concave races C C' for a set of balls D D', of which latter as many may be inserted within each race as circumstances dictate. Furthermore, these collars may be integral with the axle, but it is preferred to make them of separate pieces of hardened steel and shrink them upon said axle, the inner edges of said collars being notched at $b\ b'$ to permit oil to flow into the races C C'.

E is a cylinder forced tightly on the collars and projecting somewhat beyond their notched edges, so as to retain the balls D D' within their respective races when the hub is detached from the axle, the interior of said cylinder being filled with a suitable absorbent material F, capable of holding oil or other lubricant, and yet allowing it to escape very gradually.

G is a cylindrical hub, (here shown as adapted for application to a bicycle-wheel,) the ends of said hub being provided with internal threads H H' and external threads I I'. One end of this hub is slightly conical, as at J, and this tapering portion is slotted longitudinally at $j$ for a purpose that will presently appear.

Engaged with the internal threads H H' are cups K K', having on their inner faces conical bearings $k\ k'$, fitting against the balls D D', as seen in Fig. 2, the outer faces of said cups being pitted at L L' to admit washers M M', of felt or other flexible material, the object of these washers being to exclude dust from the ball-races. In addition to the pit L the outer face of the cup K has a pair of sockets $l\ l'$ for the engagement of a key or spanner, wherewith said cup is readily screwed into the hub G; but the other cup K' is devoid of such sockets because there is no need of adjusting it. These cups are secured in place by caps N N', engaged with the external hub-screws I I', the cap N having an inclined bearing $n$ and two perforations O O', the latter being in line with the sockets $l\ l'$ of cup K.

$a'\ a'$ are threads on the extreme ends of the axle to enable its ready fitting to a bicycle-frame.

The absorbent material F is charged with oil when the hub is first fitted together, and as all its joints are practically fluid-tight the lubricant will be retained for a great length of time, the revolutions of the wheel causing the oil to flow back and forth through the notches $b\ b'$ of the collars. Consequently the balls and their races are regularly and thoroughly lubricated without requiring the slightest personal attention.

To compensate for any wear or tear or to set up the parts so snugly as to prevent rattling, the cup K is first screwed in as far as necessary by engaging the prongs of a suitable key with the sockets $l\ l'$, and after the proper adjustment has been effected the same key is used for turning the cap N. As this cap advances its inclined bearing $n$ wedges against the conical portion J of the hub, and as the slots $j$ render this portion somewhat compressible the end of said hub is forced inwardly and grasps the cup K so firmly as to prevent its accidental turning in either direction. In Fig. 2 the pair of cups K K' are in close contact with the opposite ends of cylinder E, because said cups are now set up to their full limit and can be adjusted no farther.

It will thus be seen that the only adjustment my hub can possibly require is made in a few minutes and without detaching any part of it from the bicycle-frame. Again, the wheel can be removed from the frame and repaired or inspected without disturbing the adjustment of the oiling devices.

In the modification of my invention seen in Fig. 4 the ball-race is formed of three distinct parts P P' P'', and a wick R is shown for increasing the flow of oil through the notch that communicates with the ball-race.

In another modification perforations passing through the collars may be substituted for the notches $b\ b'$ in the rims of said collars.

I claim as my invention—

1. An axle; a pair of cones B, B', secured to said axle, and having oil-passages $b$, $b'$, and ball-races C C'; a set of balls D, D', traversing said races; cups K $k$, K' $k'$; a hub G screwed to said cups; a cylinder E, fitted within said hub, and surrounding said cones B, B', and an oil-absorbent material F, filling said cylinder and in direct contact with said axle A, all as herein described, and for the purpose stated.

2. An axle; a pair of cones B B', secured to said axle, and having oil-passages $b$, $b'$, and ball-races C, C'; a set of balls D, D', traversing said races; screw-threaded cups K, K'; a hub G engaged with said cups; caps N, N', screwed to said hub; a cylinder E fitted therein, and surrounding said cones B, B'; and an oil-absorbent material F, filling said cylinder and in direct contact with said axle, all as herein described, and for the purpose stated.

3. A wheel-hub G, threaded externally at I, tapered at J, and slotted longitudinally at $j$; in combination with the cap N, screw-threaded internally, and having an inclined bearing $n$, for the purpose described.

4. A wheel-hub having an internal thread H, external thread I, tapering portion J, and longitudinal slots $j$; a cup K threaded externally and having a pair of sockets $l$, $l'$, and a cap N, screw-threaded internally, and having an inclined bearing $n$, and perforations O, O', for the purpose described.

In testimony whereof I affix my signature in presence of two witnesses.

SETH H. LEAVENWORTH.

Witnesses:
 JAMES H. LAYMAN,
 JOHN C. ROGERS.